(12) United States Patent  (10) Patent No.: US 11,760,493 B2
Helin et al.  (45) Date of Patent: Sep. 19, 2023

(54) HUMIDIFICATION SYSTEM FOR AIRCRAFT

(71) Applicant: CTT Systems AB, Nyköping (SE)

(72) Inventors: Robert Helin, Vagnhärad (SE); Johan Spång, Nyköping (SE)

(73) Assignee: CTT SYSTEMS AB, Nyköping (SE)

( * ) Notice: Subject to any disclaimer, the term of this patent is extended or adjusted under 35 U.S.C. 154(b) by 0 days.

(21) Appl. No.: 17/960,959

(22) Filed: Oct. 6, 2022

(65)  Prior Publication Data

US 2023/0112214 A1  Apr. 13, 2023

(51) Int. Cl.
*B64D 13/06*  (2006.01)
(52) U.S. Cl.
CPC ........ *B64D 13/06* (2013.01); *B64D 2013/064* (2013.01); *B64D 2013/0662* (2013.01)
(58) Field of Classification Search
CPC .............. B64D 13/06; B64D 2013/064; B64D 2013/0662; B64D 13/00
See application file for complete search history.

(56)  References Cited

U.S. PATENT DOCUMENTS

| | | | | |
|---|---|---|---|---|
| 2,979,916 | A * | 4/1961 | Mason | F28F 27/02 236/92 R |
| 5,524,848 | A * | 6/1996 | Ellsworth | F24F 6/12 454/157 |
| 5,699,983 | A * | 12/1997 | Ellsworth | B64D 13/00 244/118.5 |
| 11,447,256 | B2 * | 9/2022 | Helin | F24F 6/00 |
| 2018/0327098 | A1 * | 11/2018 | Helin | F24F 6/04 |

FOREIGN PATENT DOCUMENTS

| | | |
|---|---|---|
| EP | 2096033 A1 | 9/2009 |
| EP | 3401220 A1 | 11/2018 |

OTHER PUBLICATIONS

European Patent Office, Extended European Search Report, dated: Mar. 16, 2022, pp. 5.

* cited by examiner

*Primary Examiner* — Benjamin P Lee
(74) *Attorney, Agent, or Firm* — Barclay Damon LLP

(57)  ABSTRACT

An aircraft humidification system includes a first duct configured to guide a first air stream, and a second duct configured to guide a second air stream, the second duct including a humidifier for humidifying the air stream in the second duct. A first conduit directs part of the second air stream to the first duct. The first conduit includes a first conduit inlet leading into the first duct and a first conduit outlet extending from the second duct. A second conduit directs part of the first air stream to the second duct, the second conduit including a second conduit inlet leading into the second duct and a second conduit outlet extending from the first duct. The first conduit outlet is arranged downstream of the humidifier, the second conduit inlet is arranged downstream of the first conduit outlet and the first conduit inlet is arranged downstream of the second conduit outlet.

18 Claims, 1 Drawing Sheet

HUMIDIFICATION SYSTEM FOR AIRCRAFT

CROSS REFERENCE TO RELATED APPLICATION

This application is based upon and claims priority to, under relevant sections of 35 U.S.C. § 119, European Patent Application No. 21202033.3, filed Oct. 11, 2021, the entire contents of which are hereby incorporated by reference.

TECHNICAL FIELD

The invention relates to the field of aircraft humidifier systems and in particular to aircraft humidifier systems that can be installed in cramped spaces and in existing environmental control systems (ECS) of aircrafts.

BACKGROUND

There is a need to provide humidifiers to existing aircrafts. A lot of commercial aircrafts that are currently in use are built without humidification systems for the AC air that is transported and provided to the cabin, crew space, cockpit and so on. The interest to install humidification systems in existing aircraft is, however, rather big and this interest poses certain technical challenges to such humidification systems. These technical challenges include limited space and high requirements regarding pressure issues, in particular pressure loss and pressure increase situations, in the ventilation systems of aircrafts.

In aircrafts, the cabin air is typically supplied with some sort of supply air. The supply air can be a mixture of recycled cabin air and fresh outside air, while alternatively the supply air consists of only fresh outside air. The supply air is normally conditioned and distributed via stems or ducts to cabin zones, the cockpit and/or crew resting areas. One can imagine that a possible solution to install a humidifier in an existing ventilation system in an aircraft could be to install a humidifier with high capacity, which would be comparably big in size, in the ventilation system, whereby this humidifier is positioned prior to any division of air streams, such as air streams to different cabin zones, cockpit and crew rest areas. An alternative to that solution would be to use a separate humidifier of smaller size in each partial air stream that goes to the consumers and thus the cabin, the cockpit or crew rest areas. As mentioned, in many cases there is, however, no space for one big humidifier nor several small humidifiers. Additionally, if many smaller humidifiers for each of the air streams are used, maintenance and economic concerns arise since many small humidifiers lead to challenges regarding faults over time and higher costs.

One potential solution could be to lead the air stream, prior to any distribution via partial air streams and ducts, through a comparably small humidifier. This solution would, however, result in too high a pressure drop and certainly lead to a humidification system and a ventilation system that is operating outside the technically acceptable boundaries, which can lead to problems in the ventilation system.

BRIEF SUMMARY OF THE DISCLOSURE

In view of the above it is an object of the present invention to provide a humidification system for aircrafts that is economic, energy saving and compact.

Another object is to provide a humidification system that can be installed in existing aircrafts and that can operate within the given technical boundaries of ventilation systems and/or environmental control systems (ECS) of aircrafts.

The inventors of the present invention have discovered that it is possible to take the given parameters such as space, pressure loss or increase and low energy use into account and provide a humidification system for aircrafts that can be installed in tight spaces in existing ECS of aircrafts. The basic concept the inventor discovered is to use one single humidifier in a partial air stream that goes to the consumer and over humidifies this partial air stream and then re-distributes this over humidified partial air stream into chosen air streams that flow towards the consumer and at the same time normalize the humidity in the partial air stream by re-distributing air from other air streams that go to consumers and in which the other air streams comprise dry and warm air. The re-distribution is done prior to any air reaching the consumer. Such a humidification system solves the above-mentioned problems and shortcomings.

Disclosed herein is a humidification system for aircrafts, comprising:
  a first duct configured to guide a first air stream;
  a second duct configured to guide a second air stream, said second duct comprising a humidifier for humidifying the air in the second duct;
  a first conduit for directing a part of the second air stream to the first duct thus interconnecting the second duct with the first duct, said first conduit comprising a first conduit inlet leading into the first duct and a first conduit outlet from the second duct; and
  a second conduit for directing a part of the first air stream to the second duct thus interconnecting the first duct with the second duct, said second conduit comprising a second conduit inlet leading into the second duct and a second conduit outlet from the first duct, wherein the first conduit outlet is arranged downstream of the humidifier, the second conduit inlet is arranged downstream of the first conduit outlet and wherein the first conduit inlet is arranged downstream the second conduit outlet.

Prior to reaching the humidifier the second duct may comprise a supply air stream and similarly prior to reaching the second conduit outlet, the first duct may comprise a supply air stream.

The humidification system according to the above embodiment can be installed in existing ECS (and new ECS) of aircrafts within the pre-described pressure loss or pressure increase boundaries without requiring substantial additional energy and within the available space in the aircraft body.

The humidification system according to the above embodiment can further be scaled and also works for three ducts, four ducts and so on whereby each of the ducts is designed to be guided towards a consumer space such as for example the cockpit, cabin, galley and/or crew resting areas.

In a further embodiment, the humidification system comprises an air supply duct configured to guide a dry supply air stream and a first two-way manifold connected to the air supply duct, the first duct and the second duct, whereby the air is configured to flow from the air supply duct into the two-way manifold and then partially into the first duct and the second duct forming the first air stream and the second air stream.

In an embodiment, the humidifier of the humidification system is an adiabatic humidifier or preferably an adiabatic evaporation humidifier, or even more preferably an adiabatic contact humidifier.

The adiabatic humidifier may comprise a contact humidifier pad that is kept wet via a water supply in order to humidify the second air stream.

An adiabatic humidifier does not require energy for providing humidity to the second air stream.

In an embodiment, a two-way manifold may be configured to split the heated supply air stream at least more or less equally into the first air stream and the second air stream. Additionally, the first conduit and the second conduit may be configured to split the second air stream and the first air stream at least more or less equally.

The foregoing split may help to provide equal air quality to the entire cabin including the cockpit and crew rest areas and lavatories.

In a further embodiment, the humidification system may comprise a bypass or bypass duct configured to bypass the humidifier on the second duct.

Such a bypass may be used in order to ensure that there are no substantial pressure losses or pressure increases present. In addition, the bypass may comprise a restrictor that is fixedly installed to balance the air flow in the bypass. In an alternative embodiment, the bypass may contain an electronically and potentially remotely controlled controlling element for adjusting the bypassing air according to a measured pressure.

The controlling element(s) disclosed herein may be a fan, a valve or a restrictor, wherein the restrictor could thereby be a fixed or adjustable restrictor.

Any of the first and second ducts or both or any of the first and second conduits may comprise restrictors to balance air flows. The restrictors may be fixedly installed restrictors or adjustable restrictors.

The restrictor(s) may be designed as plate-shaped, preferably circularly shaped plate-like elements with holes through which the air stream can pass. Such restrictors may be installed in any of the conduits or the ducts. If the restrictors are adjustable, the restrictors may be pivotally installed in the ducts or conduits so that they can be positioned from parallel to the air stream and up to 90 degrees to the air stream. Servomotors may be used to control the position of adjustable restrictors.

Any of the first and second duct or both or any of the first and second conduits may additionally comprise a pressure sensor that is connected to a controller, which controller then steers and regulates the valves in the humidification system, and in particular, the valve of the bypass.

In an embodiment, the first conduit and the second conduit may be arranged in one duct, whereby the one duct has a dividing wall to accommodate both conduits; namely, the first conduit and the second conduit.

This latter arrangement may increase space efficiency, ease installation and handling of the humidification system.

In another embodiment, the humidifier may comprising a humidifying pad for humidifying the second air stream. The humidifying pad may be kept wet via a water supply pipe or the like.

The advantage of a humidifying pad is that no energy needs to be supplied to the humidifier and that bacteria and dirt is kept on the pad and therefore does not enter the ECS of the aircraft.

In an embodiment, the first air stream and the second air stream may comprise humidified air downstream the first conduit inlet and downstream the second conduit inlet, respectively.

Thus, the first duct and the second duct supply warm and humidified air into the cabin, cockpit or crew rest areas.

Further, the first duct and/or the second duct may comprise a heating element in order to adjust the temperature of the air supplied to the consumers prior to delivery. In the second duct, the heating element may be arranged upstream the humidifier.

According to at least one embodiment of the humidification system, the first conduit and/or the second conduit comprises a controlling element.

In an embodiment, the first duct and/or the second duct comprises a controlling element, for example, in the form of valves or fans. The valves may be centrally controlled and adjusted, depending on pressure sensors arranged in the first and second duct, respectively.

The first and/or the second duct may comprise pressure sensors in order to survey the pressure. The pressure sensors may be connected to a control unit or the like, which control unit is capable of steering the ECS.

In a further embodiment, the first duct and the second duct may comprise mixing elements downstream of the first conduit inlet and the second conduit inlet, respectively.

These mixing elements may ensure a good mixing of the humidified and non-humidified air downstream of the first conduit inlet on the first duct and downstream from the second conduit inlet on the second duct.

The terms "upstream" and "downstream" used herein refer always to the present air flow direction in the duct or conduit considered. Downstream thereby means flowing along the air stream, and upstream thereby means against the flow or flowing of the air stream.

The embodiments illustrated herein can be combined and various features of one embodiment can be introduced in other embodiments. The features illustrated in one embodiment may be applied in another embodiment. None of the features are in particular excluded from being employed or implemented in another embodiment shown herein.

BRIEF DESCRIPTION OF THE DRAWINGS

The present invention will now be described, for exemplary purposes, in more detail by way of an embodiment(s) and with reference to the enclosed drawings, in which.

DETAILED DESCRIPTION

Figure 1:
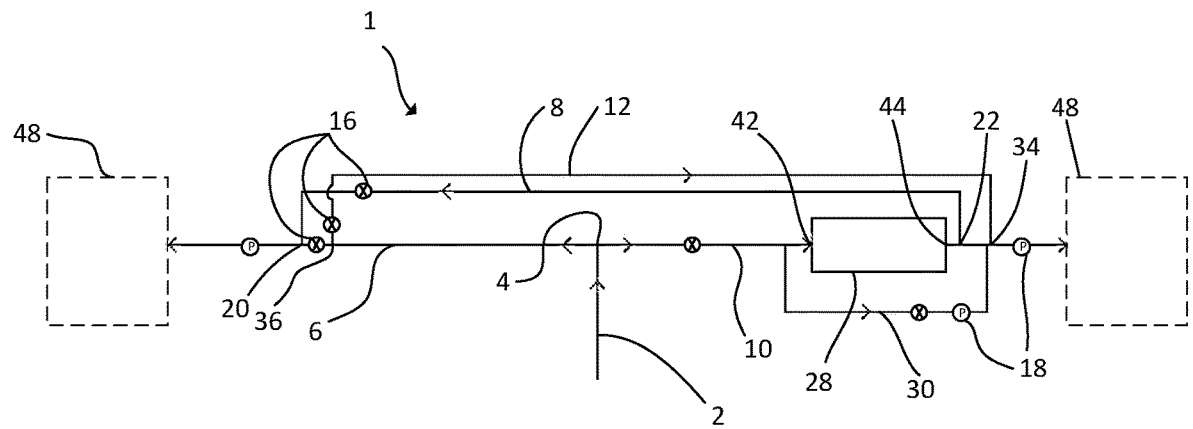
FIG. 1 schematically illustrates a diagrammatic view of an embodiment of the invention.

FIG. 1 illustrates the general and basic concept of the humidification system 1 according to the invention. The humidification system 1 comprises an air supply duct 2, a two-way manifold 4, a first duct 6 and a second duct 10. The two-way manifold 4 is connected to the air supply duct 2, the first duct 6 and the second duct 10. A supply air stream comprising fresh outside air and recycled cabin air, which supply air stream is warm and dry, is divided in the two-way manifold 4 into a first air stream in the first duct 6 and a second air stream in the second duct 10. The first air stream and the second air stream may comprise similar or the same amount of air and thus the same air flow rate. This air flow rate(s) may, however, be adapted and changed depending on circumstances and on how many ducts and therewith how many spaces within the aircraft need to be served with humidified or treated air. The second duct 10 comprises a humidifier 28, which may be of the adiabatic type, said humidifier 28 having an inlet 42 and an outlet 44. The second air stream is over humidified in the humidifier 28 to a high level so that it can be re-distributed via a first conduit 8 having a first conduit inlet 22 connected to the second duct 10, the first conduit inlet 22 being located downstream of the humidifier 22 on the second duct 10, to a first conduit outlet 20 connected to the first duct 6. In order to balance the air humidity in the second duct 10 a second conduit 12 is provided, the second conduit 12 comprising a second conduit outlet 36 connected to the first duct 6 and a second conduit inlet 34 connected to the second duct 10 downstream of the first conduit outlet 22. The second conduit outlet 36 is located upstream the first conduit inlet 20. The second and first conduits 12, 8 are therewith capable to re-distribute dry warm air from the first duct 6 and cold over humidified air from the second duct 10 so that the air streams that are delivered to the consumers 48 are of equal quality, thus humidity and temperature.

The second duct 10 may comprise a bypass 30, which bypass 30 allows a certain amount of the second air stream to bypass the humidifier 28. This bypass 30 is, in normal operation, closed but it can be opened in case there is a pressure loss somewhere in the second duct 10. As mentioned previously the bypass 30 may comprise a fixedly installed restrictor, in which the restrictor is adapted to balance the ventilation system. Such restrictors may be called passive restrictors herein.

Any of the ducts and/or conduits may comprise such passive restrictors.

Since the humidification system 1 is taking into account the operating parameters of the environmental control system (ECS) of the aircraft including, but not limited to pressure requirements in the entire ventilation system, the correct operation of the ECS is maintained. In order to further provide controlling instruments and surveillance tools, pressure sensors 18 and controlling elements 16 in the form of valves, fans or restrictors (fixed or adjustable), are provided at various positions in the humidification system 1. The pressure sensors 18 are optional and can be put where needed in order to survey the correct operation of the humidification system and the ECS. In case the pressure sensors 18 detected a pressure loss in the system, the according controlling element 16 may be engaged and a valve may be further opened, or a fan speed may be increased. If a pressure increase is detected by any of the pressure sensors 18, the respective controlling element 16 may be restricted, thus a valve opening may be reduced, or a fan speed decreased.

The pressure sensors 18 may be positioned strategically in the humidification system 1, such as for example in the bypass 30, in the first duct 6 upstream the consumers 48, or in the second duct 10 upstream the consumers 48. Each pressure sensor 18 may be arranged together and therewith close to a controlling element 16. Controlling elements 16 may thus be arranged upstream from the consumers 48 in the first and/or second ducts 6, 10. Likewise, controlling elements 16 and pressure sensors 18 may be arranged in the first conduit 8 and/or the second conduit 12.

Again, the controlling elements 16 and the pressure sensors 18 are optional solutions of the invention and the humidification system 1 is designed to work without these elements. In addition, the bypass 30 is also an optional solution and is, for instance, not shown in FIG. 2.

The arrows in FIG. 1 illustrate the general flow direction of the air streams in FIG. 1.

Figure 2:
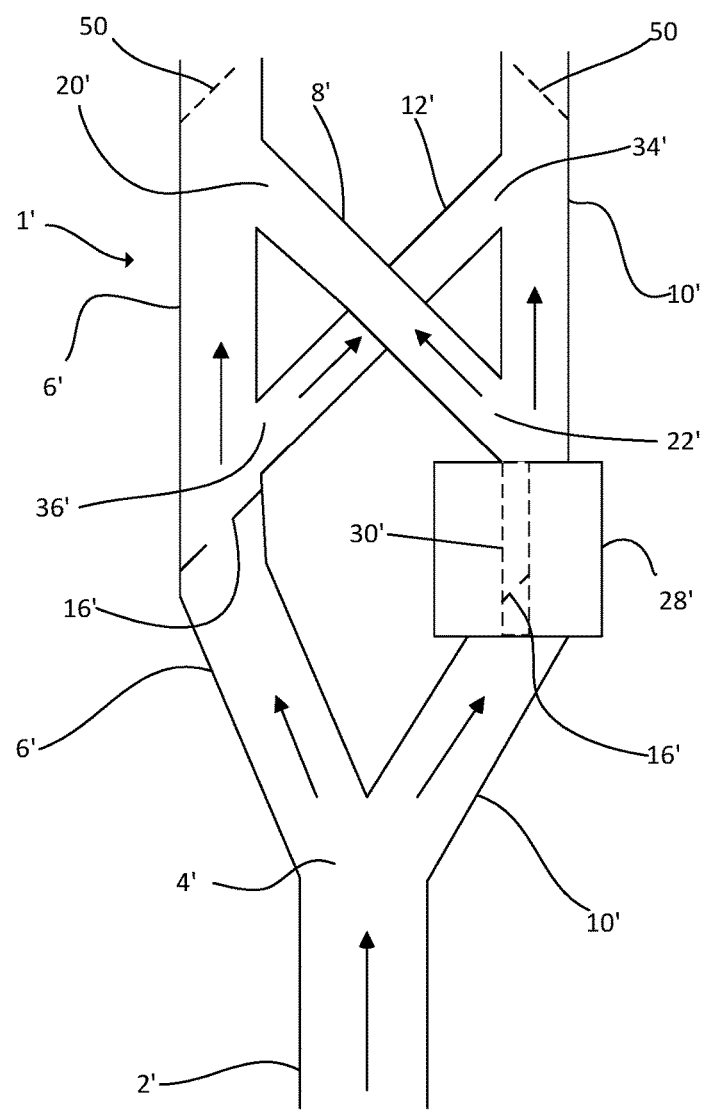
FIG. 2 schematically illustrates a cross-sectional view of an embodiment of the invention.

FIG. 2 shows another embodiment of the invention in a schematic cross-sectional view. The humidification system 1' of FIG. 2 is illustrated in a similar manner as FIG. 1, but without controlling elements and/or pressure sensors. The bypass 30' in FIG. 2 is arranged within the humidifier 28' and bypasses the actual humidification device or element, for example, in the form of a humidification pad. In order to illustrate the bypass 30 and the fact that is arranged within the humidifier 28' it is shown with dashed lines. The arrows in FIG. 2 illustrate the direction of the air flows in this embodiment.

The embodiment illustrated in FIG. 2 shows the air supply duct 2' connected to the two-way manifold 4', which then separates the supply air stream into a first air stream in the first duct 6' and a second air stream in the second duct 10'. The first conduit 8' and the second conduit 12' is also well illustrated and again the sequence on the first duct 6' of the first conduit inlet 20' on the first duct 6, the second conduit outlet 36' on the first duct 6', arranged upstream from the first conduit inlet 20' is clearly visible. Also, the sequence on the second duct 10' of the first conduit outlet 22' being arranged downstream of the humidifier 28' and the second conduit inlet 34' being arranged downstream of the first conduit outlet 22' is also clearly visible as illustrated. These sequences are of importance to guarantee the functioning of the humidification system 1, 1'.

FIG. 2 further illustrates a baffle element 50 arranged upstream of the first conduit inlet 20' within the first duct 6' and a baffle element 50 arranged upstream of the second conduit inlet 34' in the second duct 10'. The baffle elements 50 may be perforated plates or the like or other guiding elements that create turbulence in the air stream for an optimal mixing of the air stream once the dry and over humidified air streams have been combined.

In addition, FIG. 2 illustrates a controlling element 16' in the form of a passive restrictor arranged in the first duct 6' and the bypass 30'. The passive restrictor 16' comprises a flat element, for example a disc with a hole in it, for example in the center, in which the disc is arranged within the first duct 6' and/or the bypass 30'. As previously mentioned, the passive restrictor(s) may be placed at any suitable position within the humidification system 1', 1 as well as in the embodiment shown in FIG. 1. One or several or no restrictor may be arranged in the first and/or second duct 6, 6', 10, 10' and/or the first conduit 8, 8' and/or the second conduit 12, 12'. The amount and placement of the restrictors depends on system requirements and design.

The embodiments of FIGS. 1 and 2 are interchangeable, this means that any feature shown in FIG. 2 can be employed in the embodiment of FIG. 1 and vice versa. In particular, the baffle elements 50 may also be installed in the embodiment of FIG. 1 and the controlling elements 16 and pressure sensors 18 illustrated in the embodiment of FIG. 1 may be fully or partially employed in the embodiment of FIG. 2. As previously stated, the controlling elements 16, 16' may be embodied as fans, valves or passive/active restrictors.

In any of the shown embodiments of FIGS. 1 and 2, the first conduit 8, 8' and the second conduit 12, 12' may be combined in one air pipe or the like as long as the sequences of the first conduit inlet 20, 20' and second conduit outlet 36, 36' and first conduit outlet 22, 22' and second conduit inlet 34, 34' are respected.

Even though the embodiment of FIGS. 1 and 2 are both shown comprising the two-way manifold 4, 4' and the air supply duct 2, 2', this two-way manifold 4, 4' and air supply duct 2, 2' may not be present and the invention will still work or can still be employed. It could, for instance, be possible that the first and second ducts 6, 6', 10, 10' each comprise supply air streams taken from two different ports or packers of the aircraft. In that case, the two-way manifold 4, 4' is not present and the first duct 6, 6' may comprise a supply air stream prior to reaching the humidifier 28, 28' or bypass 30, 30' and similarly, prior to reaching the second conduit outlet 36, 36' the first duct 6, 6' may comprise a supply air stream.

The invention claimed is:

1. A humidification system for aircrafts comprising:
   a first duct configured to guide a first air stream;
   a second duct configured to guide a second air stream, said second duct comprising a humidifier for humidifying the air in the second duct;
   a first conduit for directing a part of the second air stream to the first duct, said first conduit comprising a first conduit inlet leading into the first duct and a first conduit outlet extending from the second duct; and
   a second conduit for directing a part of the first air stream to the second duct, said second conduit comprising a second conduit inlet leading into the second duct and a second conduit outlet extending from the first duct, wherein the first conduit outlet is arranged downstream of the humidifier, the second conduit inlet is arranged downstream of the first conduit outlet and wherein the first conduit inlet is arranged downstream of the second conduit outlet, and in which each of the first conduit, the second conduit, the first duct and the second duct are separate from one another, and wherein the first duct and the second duct each carry humidified air downstream the first conduit inlet and downstream the second conduit inlet, respectively, when the humidification system is in use.

2. The humidification system according to claim 1, further comprising an air supply duct configured to guide a supply air stream and a two-way manifold connected to the air supply duct, the first duct and the second duct, whereby the air is configured to flow from the air supply duct into the two-way manifold and then partially into the first duct and the second duct forming the first air stream and the second air stream.

3. The humidification system according to claim 1, wherein the humidifier is an adiabatic humidifier.

4. The humidification system according to claim 1, further comprising a bypass configured to bypass the humidifier on the second duct.

5. The humidification system according to claim 4, wherein the bypass comprises a controlling element.

6. The humidification system according to claim 1, wherein the first conduit and the second conduit are arranged in one duct or pipe.

7. The humidification system according to claim 1, wherein the humidifier comprises a humidifying pad for humidifying the second air stream.

8. The humidification system according to claim 1, wherein the first air stream and the second air stream comprise humidified air downstream of the first conduit inlet and the second conduit inlet, respectively.

9. The humidification system according to claim 1, wherein at least one of the first conduit or the second conduit comprises a controlling element.

10. The humidification system according to claim 1, wherein at least one of the first duct or the second duct comprises a controlling element.

11. The humidification system according to claim 1, wherein the first duct and the second duct comprise baffle elements downstream of the first conduit inlet and the second conduit inlet, respectively.

12. The humidification system according to claim 10, wherein the first duct and/or the second duct comprises at least one pressure sensor.

13. The humidification system according to claim 9, wherein the first conduit and/or the second conduit comprises at least one pressure sensor.

14. The humidification system according to claim 5, wherein the controlling element is at least one of a fan, a valve or a restrictor.

15. The humidification system according to claim 12, wherein the controlling element(s) and/or the pressure sensor(s) are connected to a control unit configured to control an environmental control system of the aircraft.

16. The humidification system according to claim 9, wherein the controlling element(s) can be any of a fan, a valve or a restrictor.

17. The humidification system of claim 10, wherein the controlling element can be any of a fan, a valve or a restrictor.

18. The humidification system of claim 13, wherein the controlling elements and/or the pressure sensor(s) are connected to a control unit configured to control an environmental control system of the aircraft.

* * * * *